Nov. 10, 1936.  H. H. ABBOTT  2,060,545
STOCK QUOTATION SYSTEM
Filed Nov. 14, 1934
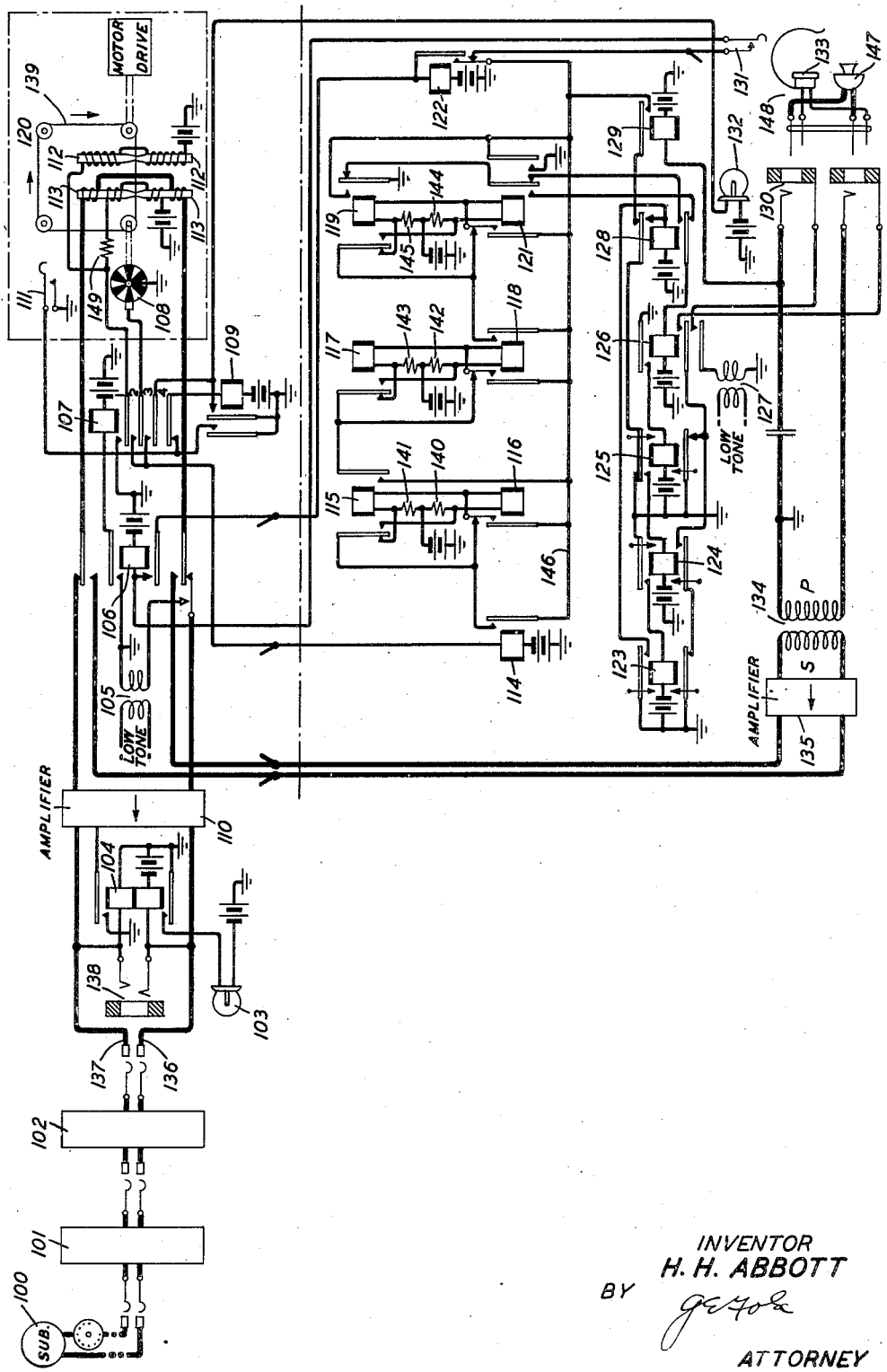
INVENTOR
*H. H. ABBOTT*
BY
*ATTORNEY*

Patented Nov. 10, 1936

2,060,545

UNITED STATES PATENT OFFICE 2,060,545

STOCK QUOTATION SYSTEM

Henry Herrick Abbott, Yonkers, N. Y., assignor to American Telephone and Telegraph Company, a corporation of New York Application November 14, 1934, Serial No. 753,035

9 Claims. (Cl. 179—6)

This invention relates to signaling systems and particularly to an automatic stock quotation system involving the use of magnetic steel tape recorders.

In metropolitan centers where the marketing of produce and securities is carried out on a large scale, it is desirable to have at hand some means for quickly and accurately obtaining a quotation on the current market price of any particular product or security.

Broadly considered, the object of the invention is to obtain an efficient automatic stock quotation service whereby those who subscribe to the service may, upon the proper manipulation of a calling device, obtain the pronouncement of a quotation message which has been magnetically transcribed on a steel tape recorder.

More particularly, the present invention comprises a telephone system in which an automatic subscriber may, by dialing a suitable impulse code designating a particular security, receive back into the telephone receiver the pronouncement of a quotation message which has been registered on a steel tape recorder, the selection of which, by the subscriber, is controlled by the dialed impulse code.

As an illustration of the manner in which the invention may be applied, one embodiment of it is herein completely described with reference to a specific kind of information system; that is, a stock quotation system in which the "bid" and "asked" price of a particular stock or bond is recorded by an operator on an individual tape recorder the connection of which, with the operator's transmission apparatus, is controlled through a key individual to said recorder while the connection of the tape with the telephone instrument of an inquiring subscriber is made over a series of switching stages settable by an impulse code. It is understood, however, that the invention is not limited to a stock quotation system, or to a telephone system, as it is apparent from the disclosure herein contained that the breadth of its application is limited only by the number of impulse codes possible with a given dial and the length of the message which may be recorded on a tape; the invention obviously being applicable to any electrical network operating on an impulse registration basis and in which the impulses are used to control the necessary number of switching stages for reaching a particular tape recorder. In accordance with the invention, therefore, one specific embodiment of which is disclosed herein by way of illustration, this is accomplished in the following improved manner:

The automatic information system herein contemplated comprises an automatic telephone line, a series of switching selectors, a number of tape recorders and an operator's position from which said recorders may be reached for purposes of recording messages thereon. The talking outlet of each recorder terminates, through suitable amplifiers, on a group of terminals on the last switching connector of a train of selectors that connect the subscriber's line with the recorder, while the talking inlet to each of said recorders is established by any suitable means to the operator's position from which the messages to be recorded on the various tapes are transmitted. Consequently, when it is desired to record or change the "bid" and "asked" quotations of a security on the tape recorder assigned to said security, the operator depresses a key individual thereto and causes the circuit of the "erasing" magnets to be operative in removing the previous record on the tape prior to its passage between the coils of the voice magnets which are simultaneously receptive to the voice currents initiated by the operator, said operator being warned by a beginning and terminating "zip" tone in the interval between which to pronounce the quotation on the tape.

The subscriber who wishes to obtain the quotation thus registered dials a code of impulses designating the particular security and the switching selectors responsive to said impulses are positioned to reach the connecting terminals of the desired tape recorder. Through suitable amplifiers the quotation contained on the recorder is transmitted to the subscriber who, as long as he has his receiver off the switchhook, will continuously and repeatedly hear the quotation. Any number of subscribers may be simultaneously connected to the same terminals for the purpose of hearing the same quotation. When a quotation is to be changed a warning tone is applied to the terminals of the appertaining recorder to apprise listening subscribers of this fact.

A clearer conception of the scope and purpose of the invention may be obtained from the following description taken in connection with the accompanying drawing and more particularly pointed out in the appended claims.

In the accompanying drawing is shown the circuit arrangement and essential parts of an automatic stock quotation announcing system, comprehended by the automatic subscriber's station 100, and the necessary apparatus for establishing a connection between the automatic recording and announcing device 120 and said station as well as another connection between said recording and announcing device 120 and the operator's recording position 130.

The magnetic tape recorder contemplated for use in this invention and shown schematically at 120, is a telegraphophone structure identical with or similar to that described in Patent 1,944,238 to Clarence N. Hickman, dated January 23, 1934. It consists, essentially, of a magnetic tape, ribbon or wire 139, continuously moving between the poles of two "voice" magnets 113 and the poles of two "erasing" magnets 112, the tape, in its movement, coming first under the influence of the erasing magnets and subsequently under the influence of the voice magnets. If the coils of the erasing magnets are energized, whatever record is contained on the tape is erased by magnetic saturation of said tape, produced thereon by the magnetic fields of the erasing magnets. The signals to be reproduced from the tape are then recorded thereon by varying its magnetic condition through the magnetic field of the voice magnets which is accomplished by the simulated voice currents produced by the pronouncement of a quotation into the speaking circuit. The tape, so magnetized, then induces a corresponding current into a suitable reproducing circuit which actuates a telephone receiver. The magnetic tape recorder 120 is shown connected through an amplifier 110 to the terminal banks of a connector 102 which, through suitable switching stages such as 101, is made accessible to the telephone lines that subscribe to the stock quotation service. If a speech record is already contained on the tape at the time the calling line establishes a connection to the amplifier 110 then, as the tape passes between the coils of the voice magnets 113, the magnetic record thereon induces a variation in the current established in the circuit between the magnets and the input circuit of amplifier 110 which, electrically, corresponds to the speech record impressed on the tape. These variations in current are then amplified and repeated to the calling line, the subscriber of which will then hear whatever message is recorded on the tape.

The operator's recording circuit consists of a transmitter 147 and a receiver 133 both of which are plugged into jacks 130 which are connected to the primary winding of a transformer 134. The secondary winding of this transformer is connected to the input side of amplifier 135, the output side of which extends to the front contacts of relay 106. When relay 106 is operated in the manner described hereinafter a pronouncement circuit is completed to the tape recorder which is utilized by the operator for recording a quotation pronouncement.

According to a preferred arrangement, there is provided one announcing circuit for each security on which quotations are to be furnished, that is, one tape recording unit 120 and amplifier 110 for each security and one operator's recording circuit for a plurality of announcing circuits, the number of announcing circuits controlled from one operator's recording circuit varying with the number of quotations to be handled.

Having generally described the nature and character of the apparatus employed in this invention, I shall now describe its detailed operation by first describing the connection of a calling line to a particular tape recorder for the purpose of listening to a quotation pronouncement already recorded thereon and later describing the operations necessary to change the pronouncement on a recording tape from an operator's recording position.

When a broker, for instance represented by line 100, dials the number of a particular announcing circuit, that is, the code number of a stock or bond assigned to a particular announcing circuit, a number of switching stages such as selector 101 and connector 102 serve to extend the line 100 to the terminals of the announcing circuit in the manner well-known to the automatic telephone switching art. At such a time a circuit is completed for relay 104 extending from battery through the lower winding of relay 104, conductor 136, through the automatic connection and line loop, conductor 137, upper winding of relay 104 to ground. Relay 104 operates and, through its upper contact, connects ground to complete the circuit of the filament elements of the amplifier 110 while through its lower contact it closes an obvious circuit to light the pilot lamp 103.

The calling line is now connected thermionically to the magnetic recorder 120 in a listening circuit established over conductor 137, through the output circuit of the amplifier 110, conductor 136 thence over the established automatic connection through switches 102 and 106 subscriber's loop, back to conductor 137 and from the input circuit of amplifier 110, over the upper back contacts of relay 106, upper winding of the upper voice magnet 113, lower winding of the lower voice magnet 113, lower outer back contact of relay 106, to the amplifier 110. As the steel magnetic tape 139 continually passes under the poles of voice magnets 113, the magnetic record contained thereon is effective to induce voice currents in the circuit above traced as a result of which the subscriber 100 is enabled to hear an oral reproduction of the record contained on the tape which, in this case would be the "bid" and "asked" quotations of a particular security to which magnetic tape 139 and the reproducing circuit associated therewith has been assigned. Inasmuch as the continuous movement of the tape 139 is uncontrolled by any line conditions but is independent thereof, the subscriber will continue to hear a reproduction of the record as long as he maintains the listening connection, or as long as the listening circuit remains undisturbed by the operation of relay 106 which takes place when a quotation is to be changed, as more completely described hereinafter.

Obviously any number of subscribers may become connected to the same security announcing circuit, the number of such subscribers being only limited by the number of connectors 102 available to calling lines, said connectors being supplied in numbers sufficient to handle the calling rate.

When the subscriber restores his receiver, switches 101 and 102 are restored in the well-known manner, relay 104 is released, ground is disconnected from amplifier 110 and lamp 103 extinguished.

When it is desired to change a quotation record on a magnetic tape, key 111 associated with the tape on which the change is to be made is operated. This key, and others associated with the different tapes assigned to the other securities, are usually located near the quotation display board or other primary source of information from which the changed quotations are obtained. When operated, this key closes the circuit of relay 109 extending from ground at the key, No. 4 contacts of relay 107, winding of relay 109 to battery. Relay 109 operates, locks through its outer contacts under the control of the No. 4 contacts of relay 107 and further closes an obvious circuit to light the "change quotation" lamp 132 located at the recording operator's position. Upon seeing the lighted lamp, the operator depresses key 131 of the security of which the quotation is to be changed, there being, of course, a separate key like 131, and a separate tape like 139 for each security. Since the operator has her headset 148 plugged into the jacks 130 and, as a consequence, relay 129 is operated over a circuit extending from battery through the winding of relay 129, tip of the upper jack 130, transmitter 147, tip of the lower jack 130, right winding P of transformer 134 to ground, the operation of key 131 further serves to complete a circuit for relay 106 extending from ground through the upper back contacts of relay 125, upper back contacts of relay 128, contacts of relay 129, normal contacts of relay 122, contacts of key 131, winding of relay 106, to battery. Relay 106 operates, disconnects the coils of voice magnets 113 from the input side of amplifier 110 and, over its top and bottom outer front contacts, connects said coils to the output side of amplifier 135. Relay 106 further connects the ungrounded side of the secondary winding of low tone transformer 105 to input side of amplifier 110 so that if, at this time, any calling subscriber's line is connected to the conductors 136 and 137, the output circuit of the amplifier is completed over the line loop, and reproduces the tone thereover to apprise the subscriber that the quotation is being changed. Relay 106 further extends the operating ground over its bottom inner contacts to the winding of relay 122 causing this relay to operate whereupon both relays lock over the front contacts of relay 122 to the aforetraced ground on the contacts of relay 129 thereby making the operated condition of relay 106 independent of start key 131. Relay 106 also closes an obvious circuit for relay 107. Relay 107 on operating, closes a circuit through the coils of "erasing" magnets 112 extending from battery, through the winding of the lower magnet and winding of the upper magnet in series, No. 1 contacts of relay 107 to ground and also, in parallel with resistance 149, through the direct current windings in series of the voice magnets 113 of the recording unit. The current through the erasing magnet produces magnetic saturation in the steel tape as it passes between the pole-pieces of these magnets while the direct current through the direct current coils of the voice magnets 113 neutralizes the residual magnetism in said tape.

The operation of relay 107 further opens the circuit of relay 109 which releases, opens the steady lighting circuit of lamp 132 and connects interrupter 108, which is geared to the tape driving shaft of the tape recorder, to flash lamp 132 over a circuit extending from interrupter ground, Nos. 2 and 3 contacts of relay 107 to the lamp, and to further operate and release relay 114 successively in parallel with said lamp from the interrupter ground.

As already mentioned, the shaft which drives the steel recording tape 139 also drives interrupter 108. This interrupter is so geared to the shaft as to produce six pulse interruptions for each complete passage of the tape between the voice and erasing magnets. Inasmuch as the quotation pronouncement has to be recorded upon the full length of the tape and in the time interval measured by one passage thereof, the pulse interruptions are used to signal the time when the pronouncement of the record is to begin and the time when it is to end. This is done as follows:

On the first operation and release of relay 114, relays 116 and 115 are operated and locked in succession. That is, when relay 114 operates and closes its contacts, a circuit is completed for relay 116 extending from battery through resistance 140, winding of relay 116, normal contacts of relay 116, contacts of relay 114, conductor 146, contacts of relay 129, to a previously traced ground on the upper back contacts of relay 125. Relay 116 operates, opens its operating circuit at its normal contacts and, through its alternate contacts, connects ground on conductor 146 to the right side of the winding of relay 115 which, at this time, also has the operating ground for relay 116 connected to the left side of its winding through the contacts of relay 114 and is thereby prevented from operating. When relay 114 releases at the termination of the grounded period of the interrupter, the shunt around the winding of relay 115 is removed and said relay operates in a circuit extending from battery, resistance 141, winding of relay 115, alternate contacts of relay 116 to ground on conductor 146. During the time that interrupter 108 is contacting with an insulating segment and, therefore, during the time in which relay 114 is normal, both relays 116 and 115 remain locked over their respective circuits to ground on conductor 146 and through the alternate contacts of relay 116.

In the meanwhile and as soon as relay 115 operates, a circuit is closed extending from ground on conductor 146, right contacts of relay 115, normally closed contacts of relay 118, winding of relay 118, resistance 142 to battery, causing said relay to operate. Relay 118 operated closes its left alternate contact to ground on conductor 146 locking itself thereby and further connecting ground to the right side of the winding of relay 117 which also has the ground extending through the right contacts of relay 115 connected to the other side of its winding through its own back contacts. Relay 117 therefore does not operate. Relay 118, on operating, completes an operating circuit for relay 121 extending from ground on conductor 146, right contacts of relay 118, normally closed contacts of relay 121, winding of relay 121, resistance 144 to battery. Relay 121 operates, locks over its left alternate contacts to ground on conductor 146, establishes a shunt to the winding of relay 119 by extending the ground through its alternate contacts to the right side of the winding of said relay, said relay further having the ground on conductor 146 extended to the other side of its winding through the right contacts of relay 118 and its own left back contacts, connects supplementary ground to conductor 146 at its right outer contacts and further closes a circuit extending from ground on the right back contacts of relay 119, right inner front contacts of relay 121, lower back contacts of relay 128, winding of relay 126, to battery. Relay 126 operates, completes a low tone circuit to the operator's receiver 133 from ground through secondary winding of source of tone transformer 127, bottom outer contacts of relay 126, sleeve of upper jack 130, head-set telephone receiver 133, sleeve of lower jack 130, bottom inner contacts of relay 126, bottom contacts of relay 125 to ground. At the same time that the tone circuit is completed, relay 126 closes an obvious circuit for slow-operate relay 125 which, on operating, opens its lower contacts and opens the tone circuit. Relay 125 further completes a circuit for slow-operate relay 124 extending from ground on the right outer contacts of relay 121, contacts of relay 129, upper back contacts of relay 128, upper front contacts of relay 125, winding of relay 124 to battery. Relay 124 operates after a small interval and reestablishes the tone circuit to the operator's receiver 133 by connecting ground through the lower contacts of relay 123, over its own bottom contacts to one side of the previously traced tone circuit. However, as soon as relay 124 operates an obvious circuit is completed for slow-operate relay 123 which, on operating after an interval, opens the tone circuit and completes an obvious circuit for relay 128. This relay, on operating, opens the circuit of relay 126 which releases, in turn causing the release of relay 125 which, on releasing, completes a locking circuit for relay 128 over the top front contacts of relay 128, top back contacts of relay 125 to ground. The operation of relay 128 further causes the release of relay 124 which, on releasing, causes the release of relay 123.

Thus at the end one pulse from interrupter 108, two short or "zip" tones have been transmitted through the operator's receiver 133. These tones are heard by the operator and together constitute the signal for her to begin the pronouncement of the quotation, which she does by speaking the quotation into transmitter 147. The transmission circuit is completed from battery through the winding of relay 129, tip spring of upper jack 130, transmitter 147, tip spring of lower jack 147, primary winding P of transformer 134 to ground. This voice circuit is repeated in the input circuit of amplifier 135 and amplified therein over a recording circuit extending from one side of the output circuit of the amplifier, bottom outer front contacts of relay 106, lower and upper voice coils of voice magnets 113, top outer front contacts of relay 106 to the other side of the output circuit of the amplifier. As the magnetic tape 139 revolves between the poles of magnets 113, the magnetic variations produced by the recording circuit on magnets 113 induce corresponding magnetic variations along the length of the tape which are later utilized to induce simulated voice currents in the reproducing circuit completed to the calling line as already described.

When relay 114 operates over the next or second grounded segment of interrupter 108 after the operation of relay 116, ground on the contacts of relay 114 is extended by way of the left front contacts of relay 115 to the battery side of the winding of relay 116. Inasmuch as ground is also connected to the other side of its winding, relay 116 is shunted and released, leaving relay 115 locally operated through the continuity contacts of relay 116 to ground over the operated contacts of relay 114. When relay 114 releases on the succeeding engagement of an insulating segment of the interrupter, the local circuit holding relay 115 is opened whereupon this relay releases, in turn removing the short circuit around the winding of relay 117 causing said relay to operate in a circuit extending from battery, resistance 143, winding of relay 117, left alternate contacts of relay 118 to ground on conductor 146.

On the closure of the circuit over the next or third grounded segment of the interrupter after the initial operation of relay 114, the previously described operating circuit of relay 116 is closed once more and said relay operates again in the manner previously described. On the release of relay 114 on the succeeding engagement of an insulating segment of the interrupter, relay 115 is also reoperated. With the reoperation of relay 115 a ground path is completed to the battery side of relay 118 from ground on conductor 146, right contacts of relay 115, front contacts of relay 117 to the battery side of the winding of relay 118 causing said relay to release while relay 117 now holds locally over the left continuity contacts of relay 118, right contacts of relay 115, to ground on conductor 146. With the release of relay 118 the short circuit around the winding of relay 119 is removed and this relay now operates in a circuit extending from battery, resistance 145, winding of relay 119, left alternate contacts of relay 121, to ground on conductor 146. Relay 119 operates but performs no useful function at this time.

On the beginning of the fourth pulse from the interrupter, that is on the fourth operation of relay 114, relay 116 is shunted and released while relay 115 holds locally to the ground supplied through the contacts of relay 114. On the release of relay 114, when the interrupter has advanced to the succeeding insulating segment, relay 115 releases but nothing happens to disturb the operated condition of relays 119 and 121 since both of these relays are locked to ground through the left alternate contacts of relay 121.

On the grounded period of the fifth pulse of the interrupter 108, relay 116 operates. On the succeeding open period relay 115 operates and both relays remain locked to ground on conductor 146 through the left contacts of relay 116. Relay 118 now operates as already described and establishes a shunt path for relay 121 through the left front contacts of relay 119 causing said relay to release, relay 119 in the meanwhile holding locally over the left continuity contacts of relay 121 and the right contacts of relay 118 to ground on conductor 146.

On the grounded period of the sixth pulse relay 116 releases as before described but no other relay is affected thereby. On the succeeding open period of the pulse cycle relay 115 releases and relay 117 operates and holds to ground through the left contacts of relay 118.

On the grounded period of the seventh pulse relay 116 again operates while on the succeeding open period relay 115 operates and holds in parallel with relay 116 as already described. With the operation of relay 115, relay 118 is released, relay 117 is held locally as described and relay 119 is released due to the opening of its holding circuit through the contacts of relay 118.

When relay 119 releases, and due to the fact that relay 128 is locked, a circuit is completed for relay 126 extending from ground in the right back contacts of relay 119, right inner back contacts of relay 121, bottom front contacts of relay 128, winding of relay 126 to battery. Relay 126 operates, momentarily closes the previously traced tone circuit to the operator's receiver 133, and closes an obvious circuit for relay 125 which, being slow to operate, pulls up after an interval thereby maintaining the tone circuit until said relay breaks the ground connection on its bottom back contacts. The operation of relay 125 further opens the locking circuit of relay 128 causing said relay to release.

Inasmuch as ground is removed from conductor 146 with the release of relay 121 the further operation and release of relay 114 in response to the grounded period of the eighth pulse will be ineffective to further operate the counting relays so that, by the beginning of said eighth pulse, the counting relays are all normal and the tone measuring and spacing relays 123, 124, 125, 126, and 128 are likewise normal.

The tone signal given to the operator at the end of the seventh pulse cycle is the signal that the recording tape 139 has made one complete passage between the poles of the erasing and voice magnets and that the entire quotation pronouncement should have been recorded thereon in the interval measured between the first two "zip" tones and the third.

Should the operator continue to talk into the transmitting circuit after the reception of the third tone, it will be ineffective since with relay 121 released and key 131 normal, there is no holding circuit for relay 106 which releases, in turn releasing relay 107 thereby restoring the transmission circuit to normal. In order to get another pronouncement into the same tape recorder 139 it will be necessary for the operator to depress key 131 once more and go through another cycle of operation in the manner already described.

It is further apparent from the foregoing description that the operator, during the pronouncement period for one security, cannot depress the key associated with the tape recorder of another security and thereby disconnect the recorder of the first security from her position. For since relay 122 is common to all recording units, its operation removed ground from the multipled conductor which extends to one side of the individual security keys such as for instance, key 131. Consequently if the operator were to depress another key after the operation of relay 122, no ground would be available to operate relay 106 of the associated recording unit.

What is claimed is:

1. In a telephone system, the combination of a telephone line, a magnetic tape recorder, an operator's position having means for transmitting a voice message to be recorded on said tape recorder, means for establishing a connection from said line to said recorder, and automatic means responsive to the establishment of said connection for transmitting a pronouncement of said message from said recorder to said line.

2. In a telephone system, the combination of a plurality of telephone lines, a plurality of magnetic steel tape recorders, an operator's position having means for transmitting a separate voice message to be recorded on each of said tape recorders, means for establishing connections between said lines and said recorders, and automatic means responsive to the establishment of said connections for transmitting over each of said connections a pronouncement of the message contained on the connected recorder.

3. In a telephone system, the combination of a plurality of telephone lines, a magnetic tape recorder, means for recording a voice message on said recorder, means for establishing coexisting connections between said lines and said recorder, and means responsive to the establishment of each of said connections for transmitting thereover a pronouncement of the message contained on said recorder.

4. In a telephone system, in combination, a telephone line, a magnetic tape recorder, an operator's position, means for establishing a voice recording connection between said position and said recorder for registering a voice message thereon, means under the control of said telephone line for establishing a listening connection between said line and said recorder, and automatic means responsive to the establishment of said listening connection for transmitting a pronouncement of said message to said line.

5. In a telephone system, in combination, a plurality of magnetic tape recorders, an operator's position, means for establishing a voice current connection between said position and any one of said recorders, and means responsive to the establishment of a connection between said position and any one of said recorders for rendering inoperative said means for establishing a voice current connection between said position and any other of said magnetic steel tape recorders.

6. In a telephone system, the combination of a recorder provided with a continuous magnetic tape and sets of recording and erasing magnets, a circuit for said erasing magnets, a voice current circuit for said recording magnets, means for continuously passing said tape between the pole pieces of said erasing magnets and the pole pieces of said recording magnets respectively, and means for closing said voice current circuit of said recording magnets and said circuit of said erasing magnets during one complete passage of said steel tape.

7. In a telephone system, the combination of a recorder provided with a continuous magnetic tape, sets of recording and erasing magnets, means for continuously passing said tape between the pole pieces of said magnets, an operator's position, a circuit for said erasing magnets, a voice current circuit for said recording magnets, means at said position for closing said voice current circuit to said recording magnets and said circuit of said erasing magnets for one complete passage of said steel tape, means responsive at the beginning of the passage of said tape under the pole pieces of said magnets for transmitting a signal to said position, means responsive at the end of the complete passage of said tape under the pole pieces of said magnets for transmitting another signal to said position, and means responsive to the complete passage of said tape under the pole pieces of said magnets for opening the circuits of said magnets.

8. In a telephone system, a calling line equipped with dial, a group of switching selectors responsive to impulses produced by said dial, a magnetic tape recorder terminating on the banks of one of said switching selectors, means for recording voice messages on said tape recorder, and means responsive to the establishment of a connection from said calling line to said tape recorder over said switching selectors for transmitting to said line a pronouncement of said message from said recorder.

9. In a telephone system, the combination of a recorder provided with a continuous magnetic tape, sets of recording and erasing magnets, means for continuously passing said tape between the pole pieces of said magnets, an operator's position, signalling means at said position, and means for measuring the interval for one continuous passage of said tape between the pole pieces of said magnets and for operating said signal at the beginning and end thereof.

HENRY HERRICK ABBOTT.